UNITED STATES PATENT OFFICE.

HERMAN OSKAR HEDSTRÖM, OF DJURSHOLM, SWEDEN.

PRODUCING COMPOUNDS OF RADIUM.

1,353,532.  Specification of Letters Patent.  Patented Sept. 21, 1920.

No Drawing.  Application filed June 21, 1919. Serial No. 305,848.

*To all whom it may concern:*

Be it known that I, HERMAN OSKAR HEDSTRÖM, subject of the King of Sweden, residing at Djursholm, in the Kingdom of Sweden, have invented certain new and useful Improvements for Producing Compounds of Radium, of which the following is a specification.

The present invention has for object methods for extracting or producing compounds of radium out of rocks, minerals, or other materials, containing radium or uranium. According to the present invention the material in question is submitted to extraction, by means of liquid ($SO_2$), that is to say, liquid sulfur dioxid. The extraction may be carried out at normal temperature (*i. e.* without heating) or at a raised temperature, as it in each case may be found suitable. The extraction may be carried out in a closed vessel of any construction suitable for the purpose whereby the compounds of radium are extracted from the material in question by the action of the liquid sulfur dioxid. The solution containing radium thereby obtained may be drawn off into a suitable vessel, whereafter the sulfur dioxid by evaporation is separated from the extract containing the radium compounds.

Oils eventually contained in the extract are, by any suitable treatment separated from the other substances contained in the extract which thereafter is, according to known methods, treated for producing barium-radium-compounds. Thus, the essential feature of the invention consists in subjecting the material to extraction by means of liquid sulfur dioxid to extract radium compounds out of the raw materials in question and thereafter treating the extract for obtaining radium - barium - compounds. If carbonaceous raw materials are used, it may be advantageous to submit the raw material to a burning (or oxidizing) process or distilling process before it is submitted to the extraction process, whereafter the ash or the residue of the distilling process, is, in the way above stated, submitted to extraction by means of liquid sulfur dioxid.

The following, among other advantages, is gained, that the mass to be treated by extraction through the burning or distilling process will be considerably reduced, so that smaller extracting vessels and less quantities of liquid sulfur dioxid are required than if the material should be treated in its native condition. Of course, the liquid or gaseous products obtained by the burning or distilling process may, in any known manner, be collected and utilized.

Having thus described my invention, I declare that what I claim is:

1. A method of extracting radium compounds from substances containing radium, which consists in subjecting such substances to the action of liquid sulfur dioxid.

2. A method of extracting radium compounds from substances containing radium, which consists in subjecting the substances to the action of liquid sulfur dioxid, and separating the radium compounds from said sulfur dioxid.

3. A method of extracting radium compounds from substances containing radium, which consists in subjecting the substances to the action of liquid sulfur dioxid, and separating the radium compounds from the sulfur dioxid by evaporation.

4. A method of extracting radium compounds from substances containing radium which consists in subjecting said substances to distillation, subjecting the residue of such distillation to the action of liquid sulfur dioxid, and separating the radium compounds from the sulfur dioxid.

In witness whereof I have hereunto set my hand in presence of two witnesses:

HERMAN OSKAR HEDSTROM.

Witnesses:
 AUG. HAGELIN,
 INGRID HAGELIN.